United States Patent [19]

Langen

[11] 4,286,702

[45] Sep. 1, 1981

[54] FEED PIPE FOR CONVEYING STICKY BULK MATERIAL

[76] Inventor: Peter Langen, Hanrathstrasse 43, 5303 Bornheim-Walberg, Fed. Rep. of Germany

[21] Appl. No.: 962,007

[22] Filed: Nov. 20, 1978

[30] Foreign Application Priority Data

Jun. 23, 1978 [DE] Fed. Rep. of Germany ....... 2827602

[51] Int. Cl.³ ............................................. B65G 11/02
[52] U.S. Cl. ...................................................... 193/2 R
[58] Field of Search ................ 193/1, 2 R, 2 A, 2 D, 193/25 B, 4, 32

[56] References Cited

U.S. PATENT DOCUMENTS

| 892,550 | 7/1908 | Ream | 193/2 R |
|---|---|---|---|
| 2,765,894 | 10/1956 | Craig | 193/2 R |
| 2,815,252 | 12/1957 | Baker | 193/1 |
| 3,891,080 | 6/1975 | Weises | 193/32 X |

FOREIGN PATENT DOCUMENTS

| 24804 | 6/1911 | Fed. Rep. of Germany | 193/2 R |
|---|---|---|---|
| 242080 | 12/1911 | Fed. Rep. of Germany | 193/2 A |

Primary Examiner—Jeffrey V. Nase
Assistant Examiner—Gene A. Church
Attorney, Agent, or Firm—Parmelee, Miller, Welsh & Kratz

[57] ABSTRACT

A feed pipe for conveying sticky bulk material from a bunker outlet vertically downward to a conveyor apparatus wherein the feed pipe is comprised of a plurality of truncated conical sections tapering downwards, the axial length and the diameter of the tubular sections being dimensioned such that arching of the bulk material is avoided.

3 Claims, 2 Drawing Figures

FEED PIPE FOR CONVEYING STICKY BULK MATERIAL

The present invention relates to a feed pipe to be used as a bulk material conveying duct between a bulk material bunker and a conveying apparatus. Systems comprised of the aforesaid components are found, for example, in power plants where the raw coal is fed via the pipe and the conveying apparatus to a coal mill. Although the present invention may be applicable in other industrial plants where bulk material which tends to stick and arch is gravity-fed, the following description will relate to coal as the bulk material.

BACKGROUND OF THE INVENTION

Coal feeders of the type mentioned above are sold by the Stock Equipment Co. in Cleveland, Ohio. The conveyor apparatus comprises a conveyor belt with load measuring means permitting automatic control of the coal mill to be supplied. Frequently, the coal mill and, consequently, its supply ducts are subjected to superatmospheric pressure, and this excess pressure will be present also in the conveyor apparatus and at its inlet where coal is charged from the bunker via the feed pipe. The coal column which will exist in the feed pipe acts as a pressure seal or a plug and so minimizes the danger that back ignition from the coal burners through the conveyor apparatus will reach the bunker where the coal is stored. Servomechanism means are provided to control an outlet valve at the bunker outlet in order to stabilize the height of the coal column in the feed pipe, the conveyor apparatus at the outlet of the feed pipe in turn being controlled by a servomechanism responsive to the coal demand of the coal mill or of the coal burners.

In the past, the feed pipe was a simple cylindrical tube provided with detectors for column height control. If the coal to be combusted is somewhat sticky, its natural slope angle may even become negative and a "bridge" will form in the feed pipe; this phenomenon is sometimes designated "arching." Arching commences by sticking of the bulk material at the inner walls of the feed pipe and the thickness of this deposit will increase with the distance from the pipe outlet. Finally, the pipe section will be completely blocked, and coal can no longer fall under gravity onto the conveyor apparatus. Above the bridge, the coal column will grow rapidly, the column height monitors will signal maximum height, and the bunker outlet valve will close. Under the circumstances, the servo system will shut off the entire plant.

Once a feed pipe has been blocked in the manner described, service personnel will try to jar or vibrate the feed pipe by means of hammer shocks in an attempt to make the arch collapse. It is evidence that this is a very unsafe and uneconomical solution.

SUMMARY OF THE INVENTION

It is an object of the invention to provide a feed pipe for such and similar systems and plants which minimize the uneneconomical interruption of plant operation. A further object is the provision of a feed pipe having a reduced tendency for even sticky material to arch therein.

According to the invention, the feed pipe consists of several tubular members interconnected by bolting or welding. Each member has a downward pointing truncated conical shape, and the axial length of the individual members is dimensioned such that it is smaller than the arch height to be expected for the particular pipe diameter and the particular bulk material. Of course, with greater diameter the arch height will be greater so that the parameter which governs the design is the ratio height/diameter of the individual member. The flow of the bulk material may be even more improved by suitable coating of the inner pipe walls with friction reducing plastics; such coating should, however, not be provided over the entire circumference of the inner wall. In fact, if low-friction portions alternate with high-friction portions, flow paths of different flow speed will form which further reduces the tendency toward arching.

In result, the complete feed pipe exhibits several throats or constrictions, and it appears to be surprising that contrary to what would normally be expected, such throats improve the free flow of even sticky material. However, the bulk material behaves as if it would fall successively through several short tubes, each of the consecutive tubes being too short to permit forming of an arch. At the joints between adjacent tubular members, the bulk material adjacent the walls is no longer subjected to the load of the material column thereabove, and it is this load which otherwise makes arching commence.

BRIEF DESCRIPTION OF THE DRAWINGS

A preferred embodiment of the invention is shown in the accompanying drawing.

DESCRIPTION OF THE EMBODIMENT

Figure 1:
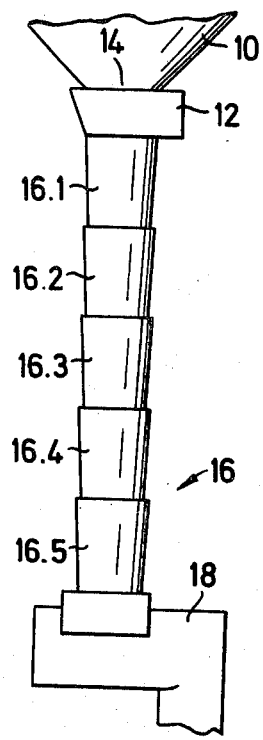
FIG. 1 illustrates schematically components of a coal feeding system incorporating the feed pipe of the invention.

In FIG. 1, a coal bunker 10 having an outlet valve system 12 at its outlet 14 is connected, via a feed pipe 16, to the inlet of a conveyor apparatus 18. Bunker 10, outlet valve 12 and conveyor 18 are not affected by the invention and of conventional design; it may be assumed that the conveyor 18 includes a conveyor belt scale and supplies coal to a coal mill (not shown). Both the coal mill and the conveyor 18 are further assumed to be subjected to excess air pressure. The feed pipe 16 is of sufficient height to make the coal column therein form an air pressure seal or plug, the seal being of the labyrinth type. The minimum flow restriction which must be performed by such a seal is predetermined for safety reasons.

As indicated above, in conventional designs the feed pipe would have been a simple hollow cylinder. According to the invention, the feed pipe is constructed of several sections of truncated conical form, and FIG. 1 shows that in this embodiment there are five sections 16.1 to 16.5 bolted together to provide the pipe 16.

The dimensions of the individual sections 16.1–16.5 depend primarily upon the type and nature of the bulk material to be fed. The ratio between the average diameter and the axial length of each section may be between 1:1 and 1:5, and for the sticky coal to be fed in the embodiment of the invention shown a ratio of 1:1.5 was elected. The cone angle also depends on the type of the bulk material and may be between 4° and 12°. In the embodiment shown, a cone angle of 6° proved to be the optimum, so that the angle $\beta$ indicated in FIG. 2 will be 3°.

Figure 2:
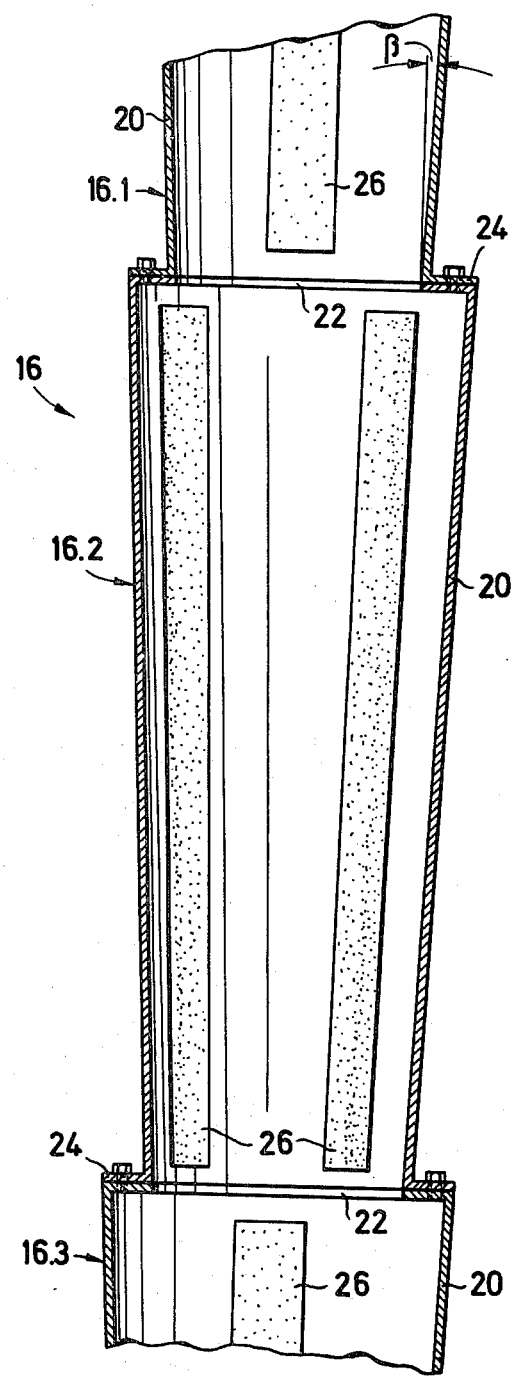
FIG. 2 shows a portion of the feed pipe illustrated in FIG. 1 in longitudinal section view.

FIG. 2 illustrates an individual section 16.2 in detail. It will be noted that each section comprises a truncated cone wall portion 20, an upper inwardly protruding flange 22 and a lower outwardly protruding flange 24. The inner diameter of flange 22 and the inner diameter of the juxtaposed section 16.1 at its narrowmost lower end are substantially equal, and in a similar manner the outer diameter of flange 24 is substantially equal to the outer diameter of the adjacent section 16.3 at its uppermost end. It is preferred but not compulsory to make the sections 16.1–16.5 equal to each other.

It will be further seen in FIG. 2 that slip straps 26 made of acetal resin are mounted on portions of the inner walls. The friction of the coal on such straps is substantially reduced relative to the adjacent "nude" steel walls, and as a result flow paths of different flow characteristics will be created in circumferentially staggered disposition. It is preferred to dispose the straps 26 of one section, say section 16.2, circumferentially offset with respect to the straps of the preceding and of the next following sections 16.1 and 16.3 respectively.

It will be noted that the illustrated embodiment may be modified without departing from the spirit of the invention. For example, instead of truncated conical sections, inverted truncated pyramidal sections may be used, the pyramids having a rectangular or square cross sectional shape. Further, at the joints the diameter need not suddenly vary but the alternation between narrow and wide diameter may be smooth.

What is claimed is:

1. A vertically mounted feed pipe for gravity feeding from a bunker outlet into a conveying apparatus bulk material having a tendency to arch, said feed pipe consisting of a plurality of serially connected downwardly tapering tubular members of substantially identical design having a ratio of their axial length to their average diameter which is smaller than that required for arching of the bulk material to occur and at least one of said tubular members having about its inner circumference first and second surface portions having different coefficients of friction with respect to the bulk material.

2. A feed pipe as set forth in claim 1 wherein said at least one tubular member is made of steel and is provided with plastic coatings at each second surface portion.

3. A feed pipe as set forth in claim 2 wherein at least two adjacent tubular members have said coating and the coated portions of one tubular member are staggered in circumferential direction with respect to those of the other member.

* * * * *